United States Patent
Yen

(10) Patent No.: US 6,539,230 B2
(45) Date of Patent: *Mar. 25, 2003

(54) DYNAMIC MAINTENANCE OF LOCATION DEPENDENT OPERATING PARAMETERS IN A WIRELESS TERMINAL

(75) Inventor: Wen-Kai Yen, Alpharetta, GA (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/377,591

(22) Filed: Aug. 19, 1999

(65) Prior Publication Data

US 2003/0036389 A1 Feb. 20, 2003

(51) Int. Cl.$^7$ ................................................. H04Q 7/20
(52) U.S. Cl. ..................... 455/456; 455/432; 455/444; 455/458; 455/440; 455/441
(58) Field of Search ................... 455/456, 458, 455/428, 13.2, 13.3, 432, 433, 435, 436, 440, 441, 445, 444; 342/450, 458, 463, 464, 465; 701/200, 300

(56) References Cited

U.S. PATENT DOCUMENTS

| | | | |
|---|---|---|---|
| 5,235,633 A | * 8/1993 | Dennison et al. | 379/60 |
| 5,442,805 A | 8/1995 | Sagers et al. | 455/33.1 |
| 5,506,863 A | 4/1996 | Meidan et al. | 375/202 |
| 5,539,748 A | 7/1996 | Raith | 370/95.1 |
| 5,546,445 A | 8/1996 | Dennison et al. | 379/60 |
| 5,551,058 A | 8/1996 | Hutcheson et al. | 455/33.2 |
| 5,629,710 A | * 5/1997 | Sawada | 342/457 |
| 5,678,182 A | 10/1997 | Miller et al. | 455/33.1 |
| 5,682,147 A | 10/1997 | Eaton et al. | 340/825.03 |
| 5,809,421 A | 9/1998 | Manssen et al. | 455/434 |
| 5,815,814 A | 9/1998 | Dennison | 455/456 |
| 5,815,816 A | * 9/1998 | Isumi | 370/338 |
| 5,857,155 A | 1/1999 | Hill et al. | 455/456 |
| 5,901,142 A | * 5/1999 | Averbuch et al. | 370/329 |
| 6,011,973 A | * 1/2000 | Valentine et al. | 455/456 |
| 6,078,575 A | * 6/2000 | Dommety et al. | 370/338 |
| 6,085,096 A | * 7/2000 | Nakamura | 455/456 |
| 6,104,931 A | * 8/2000 | Havinis et al. | 455/456 |
| 6,167,266 A | * 12/2000 | Havinis et al. | 455/433 |
| 6,167,268 A | * 12/2000 | Souissi et al. | 455/434 |
| 6,181,934 B1 | * 1/2001 | Havinis et al. | 455/432 |
| 6,198,934 B1 | * 3/2001 | Ohtsuki | 455/456 |
| 6,223,042 B1 | * 4/2001 | Raffel | 455/455 |
| 6,230,017 B1 | * 5/2001 | Andersson et al. | 455/456 |
| 6,233,448 B1 | * 5/2001 | Alperovich et al. | 455/417 |

* cited by examiner

Primary Examiner—Edward F. Urban
Assistant Examiner—Marceau Milord
(74) Attorney, Agent, or Firm—Jeffrey M. Weinick

(57) ABSTRACT

A wireless terminal dynamically maintains location dependent operating parameters while operating in low power-consuming sleep mode. The wireless terminal wakes up periodically to determine its current location. If the current location is within a predetermined distance from a previously stored location, then the wireless terminal stores the previously stored location, along with its associated location dependent operating parameter, in a predetermined memory location within the wireless terminal. If the current location is not within a predetermined distance from a previously stored location, then the wireless terminal generates a new location dependent operating parameter for its current location and stores the current location and new location dependent operating parameter in the predetermined memory location. In various embodiments, the location dependent operating parameter may be, for example, a digital control channel or a mobile switching center identification. In an embodiment in which the location dependent operating parameter is a mobile switching center identification, the wireless terminal may register with an identified mobile switching center when the predetermined memory location is updated.

46 Claims, 2 Drawing Sheets

FIG. 3
| LOCATION | PARAMETER |
|---|---|
| $X_1, Y_1$ | $PARAMETER_1$ |
| $X_2, Y_2$ | $PARAMETER_2$ |
| ⋮ | ⋮ |
| $X_i, Y_i$ | $PARAMETER_i$ |
| ⋮ | ⋮ |
| $X_n, Y_n$ | $PARAMETER_n$ |
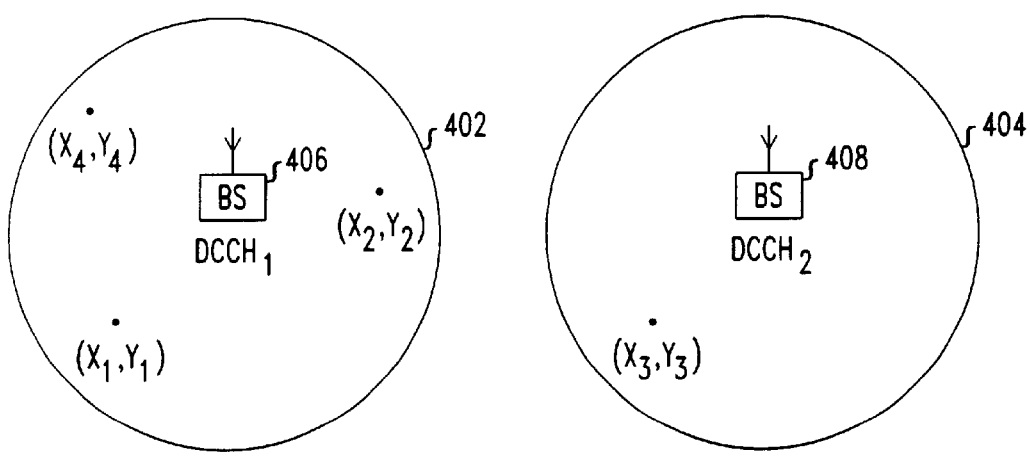
FIG. 4
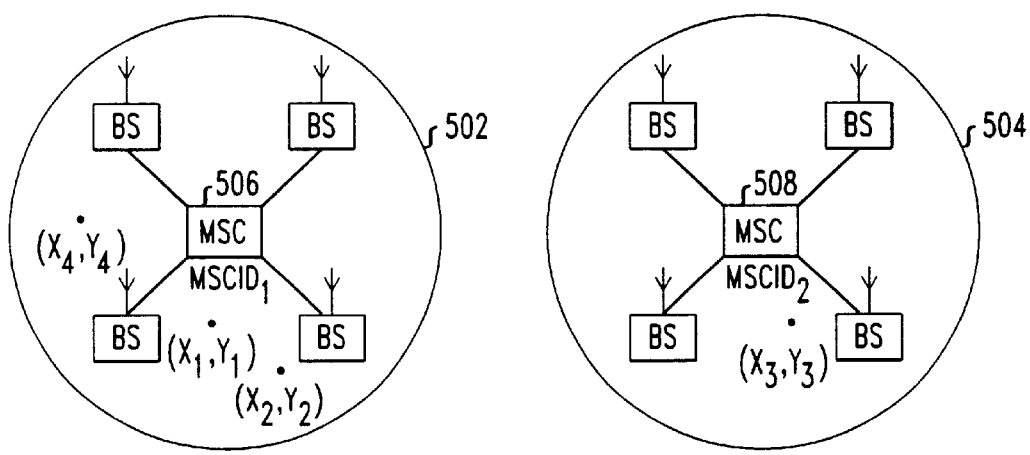
FIG. 5

DYNAMIC MAINTENANCE OF LOCATION DEPENDENT OPERATING PARAMETERS IN A WIRELESS TERMINAL

FIELD OF THE INVENTION

The present invention relates generally to wireless communication systems. More particularly, the present invention relates to the maintenance of wireless system data in a wireless terminal.

BACKGROUND OF THE INVENTION

In a wireless communication system, certain operating parameters of a mobile wireless terminal (e.g. wireless telephone) depend on the location of the wireless terminal. These location dependent operating parameters change as the wireless terminal changes location.

In a wireless cellular system, the overall geographic area which is serviced by a service provider is divided into a plurality of regions, called cells. Each cell has equipment which allows the wireless terminals operating within the cell to communicate with the wireless system. This equipment generally includes one or more antennas connected to radio equipment, and processing hardware for controlling the equipment. Such equipment is well known in the art and will be referred to herein as a base station or cell site.

In a digital cellular system, each cell is assigned a digital control channel (DCCH) which is used to communicate control information between wireless terminals operating within the cell and the cell's base station. In addition, each cell is assigned a number of voice channels which are used for voice communications by the wireless terminals operating within the cell. The DCCH is used to page a wireless terminal when an incoming call is received and to allow the wireless terminal to signal to the base station that the wireless terminal desires to initiate an outgoing call. The DCCH is also used to set up a call by notifying the wireless terminal of the voice channel assigned to a particular call. The DCCH is a location dependent operating parameter because the DCCH used by a wireless terminal will change as the location of the wireless terminal changes.

Currently, a wireless terminal must continuously monitor the DCCH, and when the signal strength of the DCCH falls below a threshold, the wireless terminal scans the frequency band for another stronger DCCH signal. Generally, the DCCH frequencies are not known to the wireless terminal, which requires that the wireless terminal scan the entire frequency spectrum of the wireless system in order to find a new DCCH. When the strongest DCCH signal is determined, the wireless terminal uses this DCCH for subsequent control communication with the cellular system (i.e., the wireless terminal "camps on" to the new DCCH). This process of changing DCCHs is called reselection. Reselection is similar to the wireless communication technique of a handoff, but handoff refers to changing voice channels during an existing call, while reselection refers to camping on to a new DCCH when there is no active call.

Thus, during operation, a wireless terminal must continuously monitor the DCCH to determine when its signal strength falls below a threshold, and then scan the frequency spectrum for a new DCCH to camp on to. One problem is that the reselection process (i.e., monitoring of the current DCCH signal and the subsequent scanning and camping on) requires that the radio equipment within the wireless terminal remain active. This tends to drain the battery and reduces the operation time that a wireless terminal receives with a given battery.

Another location dependent operating parameter is the identification of the serving mobile switching center (MSC). As is well known, the multiple base stations in a geographic region are connected to one or more MSCs. The MSC controls the overall operation of the wireless communication system, including the overall operation of the base stations connected to the MSC. For purposes of this description, it will be assumed that the multiple base stations within a geographic service area are connected to, and controlled by, a single MSC. It is further assumed that each MSC is associated with a single service provider. Thus, while a wireless terminal moves about within a particular geographic area, it may switch between serving base stations, but it will be receiving service from a single MSC. However, when the wireless terminal travels outside the geographic area served by the MSC, it may enter another geographic area served by another MSC and another service provider. This situation is known as roaming.

As is well known, in order for a roaming wireless terminal to obtain service, the wireless terminal must register with an MSC to set up what is called a visitor location register (VLR) in the MSC. The VLR is an entry in the memory of the MSC which contains a profile of the wireless terminal and which indicates to the MSC that the wireless terminal may operate in the geographic area served by the MSC. In current systems, the DCCH transmits an identification associated with the MSC, called the MSCID. Thus, when a wireless terminal camps on to a DCCH which is transmitting a new MSC identification, the wireless terminal knows that it is roaming and that it must register with the new MSC. A problem similar to the problem described above arises in the roaming context. The wireless terminal must continually scan the DCCH to determine when it is roaming and when it needs to re-register with a new MSC. Again, this continuous scanning and registering tends to drain the battery and reduces the operation time that a wireless terminal receives with a given battery.

One known technique for addressing these problems is to use location information to control certain operating parameters of the wireless terminal. The location information may be supplied, for example, by a global positioning satellite (GPS) receiver in the wireless terminal, or by other location measurement techniques (e.g. triangulation based on signal strengths, dead reckoning). Such techniques are described in the following U.S. Pat. Nos. 5,442,805; 5,678,182; and 5,857,155. One problem with these techniques is that they rely on predetermined locations being programmed into the wireless terminal. Thus, for example, geographic data and associated wireless terminal operating parameters are pre-programmed into the wireless terminals so that the wireless terminals know what operating parameters to use when operating in a pre-programmed location. The scheme utilized in these techniques is not flexible because the location information and operating parameter information must be pre-programmed into the wireless terminal. Thus, as location and parameter information changes, the stored data in each wireless terminal must also change. Further, these techniques may only be used in geographic areas for which data has been pre-stored into the wireless terminal. If the wireless terminal travels to a geographic location for which location and operating parameter data is not already pre-stored in the wireless terminal, these techniques will not work.

SUMMARY OF THE INVENTION

The present invention solves the problems of the prior art by dynamically maintaining location dependent operating parameters in a wireless communication terminal.

In accordance with an embodiment of the invention, the wireless terminal dynamically maintains, in a memory of the wireless terminal, a list of previous locations and associated location dependent operating parameters. The wireless terminal periodically determines its current location and then determines whether the current location is within a predetermined distance from a previously stored location. If the current location is within the predetermined distance from the previously stored location, then a determination is made that the location dependent operating parameter stored in association with the previously stored location is appropriate for use in the current location, and the previous location along with its associated location dependent operating parameter, is stored in a predetermined memory location in the wireless terminal. Alternatively, if the current location is not within the predetermined distance from the previously stored location, then the wireless terminal generates a new location dependent operating parameter for its current location and stores the current location and new location dependent operating parameter in the predetermined memory location.

In this manner, the predetermined memory location contains the operating parameter appropriate for use in the current location of the wireless terminal. In one embodiment, the wireless terminal stores locations and associated location dependent operating parameters in a location/parameter table stored in memory, and the predetermined memory location is the first entry of the table. As the wireless terminal moves, new locations and parameters are stored in the first entry of the table with the remaining table entries being shifted down. As such, when the wireless terminal needs to use the location dependent operating parameter, it is readily available to the wireless terminal in the first entry of the table.

In one advantageous embodiment, the location dependent operating parameter is the digital control channel. Thus, in operation in this embodiment, the wireless terminal will be in a low power-consuming sleep mode and will wake up periodically to determine its current location and update its location/parameter table if necessary. When a wireless terminal needs to place a call using the DCCH, or monitor for an incoming call page using the DCCH, the appropriate DCCH for the wireless terminal's current location is immediately available to the wireless terminal in the first entry of the location/parameter table.

In accordance with another embodiment, the invention is used to improve the roaming capability of a wireless terminal. In this embodiment, the location dependent operating parameter is the MSCID. Again, the wireless terminal remains in a low power consuming sleep mode and wakes up periodically to determine its current location and update its location/parameter table with the MSCID of the current serving MSC if necessary. In this embodiment, if the first entry of the location/parameter table needs to be updated with a new MSCID, then the wireless terminal will also re-register with the new MSC identified by the MSCID. Thus, the wireless terminal remains registered with the appropriate MSC so that it may obtain service from the MSC.

In accordance with one advantage of the invention, the wireless terminal dynamically maintains location dependent operating parameters while conserving battery power. The wireless terminal may operate in a low power-consuming sleep mode and only wake up periodically in order to perform a current location determination, and then update its location dependent operating parameters only if necessary. The principles of the invention allow for the maintenance of location dependent parameter data without the need for predetermined locations and associated operating parameters being pre-programmed into the wireless terminal.

These and other advantages of the invention will be apparent to those of ordinary skill in the art by reference to the following detailed description and the accompanying drawings.

BRIEF DESCRIPTION OF THE DRAWINGS

FIG. 3 illustrates the location/parameter table;

FIG. 4 shows the geographic area serviced by a wireless communication service provider; and FIG. 5 shows the geographic area serviced by two wireless communication service providers.

DETAILED DESCRIPTION

Figure 1:
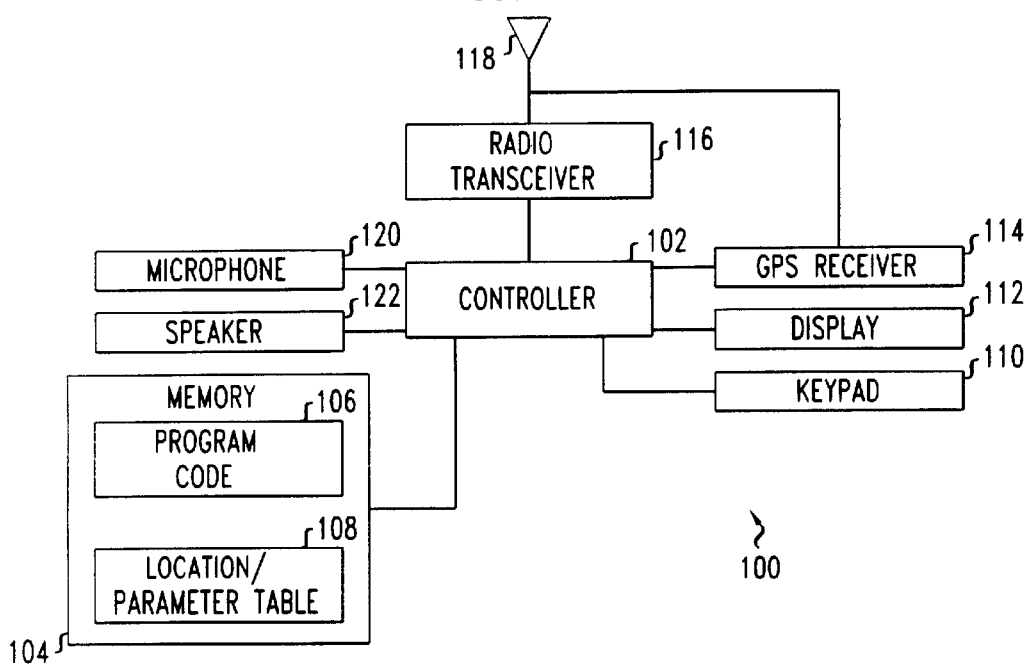
FIG. 1 shows a block diagram of a wireless terminal.

A block diagram of a wireless terminal 100 which may be configured in accordance with the present invention is shown in FIG. 1. The wireless terminal 100 comprises a controller 102 which controls the overall operation of the wireless terminal 100 in accordance with computer program instructions stored as program code 106 in memory 104. Memory 104 also contains a location/parameter table 108 which will be described in further detail below in conjunction with FIG. 3. The wireless terminal 100 also includes a radio transceiver 116 connected to an antenna 118 for communicating with a wireless communication system. The controller 102 is also connected to a keypad 110, display 112, microphone 120, and speaker 122 in a convention manner which is well known in the art. The wireless telephone 100 also includes a global positioning satellite (GPS) receiver 114 connected to the controller 102 and antenna 118. The GPS receiver 114 receives signals from GPS system satellites and determines the location of the wireless terminal. Although FIG. 1 shows GPS receiver 114 connected to the same antenna 118 as is used for radio communication, in alternate embodiments the wireless terminal may have an additional antenna dedicated for use in connection with the GPS receiver. Those skilled in the art will recognize that FIG. 1 is a high level block diagram of a wireless terminal which may be configured for use in accordance with the present invention. Wireless terminals of the type generally shown in FIG. 1 are well known in the art and further details of the configuration of the wireless terminal will not be provided herein. The present invention may be practiced by implementing appropriate program code 106 and location/parameter table 108 in memory 104 as described below.

The description of the invention will proceed as follows. First, a description of the general steps to be performed by the wireless terminal will be described. Then, the application of the method steps to two particular embodiments will be described.

Figure 2:
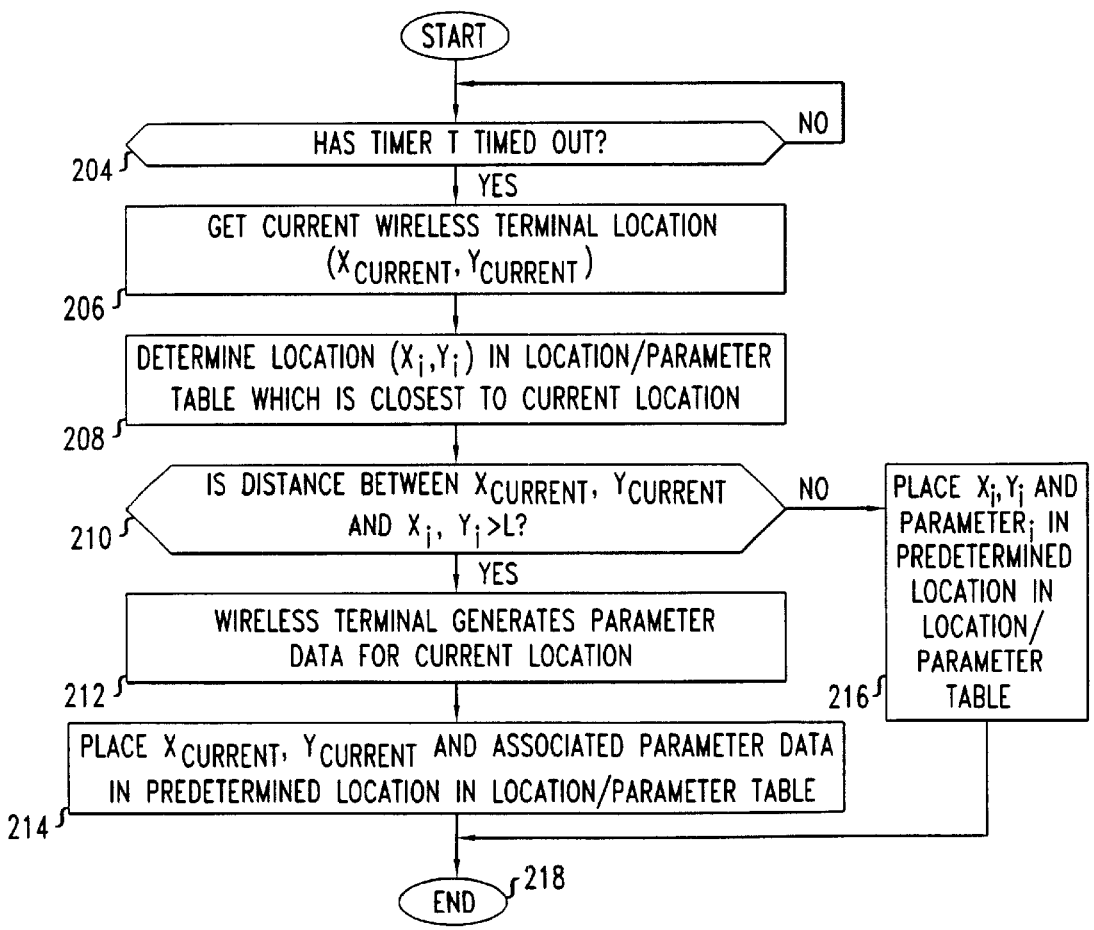
FIG. 2 shows the method steps performed by a wireless terminal in accordance with an embodiment of the invention.

FIG. 2 shows the method steps performed by the wireless terminal 100 in accordance with an embodiment of the invention. The steps are defined by computer program code 106 stored in memory 104 which is executed by the controller 102. The performance of the method steps of FIG. 2 results in the maintenance of the location/parameter table 108 in memory 104. The location/parameter table 108 is shown in further detail in FIG. 3. The location/parameter table 108 contains two columns, location column 302 and parameter column 304. For a particular location stored in the location column 302, the location dependent operating parameter for that location is stored in the parameter column 304. In one embodiment, wireless terminal locations are represented as (x,y) where x represents latitude and y represents longitude. Thus, for location $(x_i, y_i)$, there is an associated parameters which is the location dependent operating parameter for location $(x_i,y_i)$. As will be described in further detail below, the location dependent operating parameters stored in the location/parameter table 108 will be different in different embodiments of the invention.

Returning now to FIG. 2, the steps to be performed by the wireless terminal in accordance with an embodiment of the invention will be described. In step 204 it is determined whether a timer T has timed out, where T is initialized to some time period. Thus, step 204 delays until the time period T has been reached, at which point control is passed to step 206. T should be set to a time period which represents the amount of time it is likely to take for a location dependent operating parameter to become stale, and appropriate values for T will depend on the particular embodiment.

In step 206 the current location of the wireless terminal is obtained from the GPS receiver 114. The current latitude is assigned to $x_{current}$ and the current longitude is assigned to $y_{current}$. In step 208 the wireless terminal determines the location $(x_i,y_i)$ in the location/parameter table 108 which is closest to $(X_{current}, y_{current})$. The wireless terminal can calculate the distance between $(x_{current}, y_{current})$ and an entry in the location/parameter table 108 $(x_i,y_i)$ by using the following formula:

$$Distance = \sqrt{(x_{current}-x_i)^2+(y_{current}-y_i)^2}$$

In step 210 the wireless terminal determines whether the distance between $(x_{current}, y_{current})$ and $(x_i,y_i)$ is greater than a value L, where L represents a distance which, if traveled by the wireless terminal, may render the current location dependent operating parameter to become stale. Appropriate values for L will depend on the particular embodiment.

If the closest location/parameter table location $(x_i,y_i)$ is not greater than the distance L, then it is assumed that parameter$_i$, which is stored in the location/parameter table 108 associated with the location $(x_i,y_i)$ found in step 208 is still valid data for the current location of the wireless terminal, and in step 216 $(x_i,y_i)$ and data$_i$ are stored in a predetermined location in the location/parameter table 108. In an advantageous embodiment, the predetermined location is the first entry in the location/parameter table 108, in which case all other location/parameter table entries are shifted down one entry, with the last entry being removed from the table if there is no more room in the table. As such, the location and parameter data recently stored in the first entry remain toward the top of the location/parameter table 108. Further, the last entry may be removed from the location/parameter table 108 because it contains the least frequently used data. The method ends in step 218.

If the closest location/parameter table location $(x_i,y_i)$ is greater than the distance L, then it is assumed that parameter$_i$,which is stored in the location/parameter table 108 associated with the location $(x_i,y_i)$ found in step 208 is not valid data for the current location of the wireless terminal, and in step 212 the wireless terminal generates a new location dependent operating parameter for its current location. The step of generating a new location dependent operating parameter will depend on the particular embodiment of the invention. Next, in step 214 $(x_{current}, y_{current})$ and the location dependent operating parameter generated in step 212 are stored in the predetermined location of the location/parameter table 108. The method ends in step 218.

Thus, after the method steps have been performed, the predetermined location of the location/parameter table 108 contains the location dependent operating parameter which is valid for the current location of the wireless terminal. As such, the data is quickly accessible for use by the wireless terminal during operation.

In one embodiment of the invention, the wireless terminal is operating in a digital wireless communication system in which each cell site is assigned a particular digital control channel (DCCH). As described above, the wireless terminal must be camped on to this DCCH in order to receive service from the wireless communication system. In the prior art techniques, the wireless terminal had to continuously monitor the DCCH signal and when the signal strength of the DCCH fell below some threshold, the wireless terminal had to re-scan the frequency band in order to find, and camp on to, a new DCCH. This constant monitoring and scanning uses a substantial amount of battery power and reduces the operating time of the wireless telephone. This problem of the prior art is solved by the present invention.

This embodiment of the invention, in which the location dependent operating parameter is the DCCH will be described in conjunction with FIG. 4, which shows the geographic area serviced by a particular wireless communication service provider. Two cells are shown. Cell 402 contains base station 406 for providing wireless service to wireless terminals operating within cell 402. Base station 406 is assigned digital control channel $DCCH_1$ for communicating control information to wireless terminals operating within cell 402. Cell 404 contains base station 408 for providing wireless service to wireless terminals operating within cell 404. Base station 408 is assigned digital control channel $DCCH_2$ for communicating control information to wireless terminals operating within cell 404. For purposes of this description, assume a wireless terminal is initially operating at location $(x_1,y_1)$ within cell 402.

In this embodiment, the value L represents the distance which, if traveled by the wireless terminal, would generally require that the wireless terminal switch to a new DCCH. In other words, this is the distance which, if traveled by the wireless terminal, would generally result in the wireless terminal entering a new cell. An advantageous value for the value L in this embodiment would be the average radius of the cells in the wireless system (e.g., 10 miles).

Assume for purposes of this description that the location/parameter table stored in the wireless terminal when it is at location $(x_1,y_1)$ has only one entry as follows:

| LOCATION | PARAMETER |
|---|---|
| $(x_1,y_1)$ | $DCCH_1$ |
| . | . |
| . | . |
| . | . |

Next assume that when the timer T times out in step 204 the wireless terminal is located at location $(x_2,y_2)$ as shown in FIG. 4. Thus, in step 206 the wireless terminal will use GPS receiver 114 to determine its current location. In step 208, the wireless terminal will determine that the first entry of the location/parameter table, having location $(x_1,y_1)$, is the closest to the current location of $(x_2,y_2)$ (as shown above, $(x_1,y_1)$ is the only other location in the location/parameter table). Assuming that the distance between $(x_1,y_1)$ and $(x_2,y_2)$ is less than L, control will pass to step 216 at which point the entry containing $(x_1,y_1)$ and $DCCH_1$ is placed in the first location of the location/parameter table. Since this entry is already in the first location, no change to the location/parameter table is required and the method ends in step 218.

Assume now that the next time the timer T times out in step 204 the wireless terminal is located at location $(x_3,y_3)$ as shown in FIG. 4. Thus, in step 206 the wireless terminal will use GPS receiver 214 to determine its current location. In step 208, the wireless terminal will determine that the first entry of the location/parameter table, having location $(x_1, y_1)$, is the closest to the current location of $(X_3,y_3)$ (again, $(x_1,y_1)$ is the only location in the location/parameter table). Now, however, assume that the distance between $(x_1,y_1)$ and $(X_3,y_3)$ is greater than L. Thus, control passes to step 212, at which point the wireless terminal performs a frequency scan for a new DCCH. As shown in FIG. 4, BS 408 is assigned $DCCH_2$ for cell 404, and thus the wireless terminal determines that $DCCH_2$ is the new current control channel. Next, in step 214, the wireless terminal places its current location $(x_3,y_3)$ and $DCCH_2$ in the first location of the location/parameter table and shifts the other entries down, which results in a location/parameter table as follows:

| LOCATION | PARAMETER |
| --- | --- |
| $(x_3,y_3)$ | $DCCH_2$ |
| $(x_1,y_1)$ | $DCCH_1$ |
| . | . |
| . | . |
| . | . |

Now assume that the next time the timer T times out in step 204 the wireless terminal is located at location $(x_4,y_4)$ as shown in FIG. 4. Thus, in step 206 the wireless terminal will use GPS receiver 114 to determine its current location. In step 208, the wireless terminal will determine that the second entry of the location/parameter table, having location $(x_1,y_1)$, is the closest to the current location of $(x_4,y_4)$. Assuming that the test in step 210 indicates that the distance between $(x_1,y_1)$ and $(X_4,y_4)$ is less than L, control will pass to step 216, at which point the entry containing $(x_1,y_1)$ and $DCCH_1$ is placed in the first location of the location/parameter table and the other entries are shifted down. The method ends in step 218. The resulting location/parameter table is as follows:

| LOCATION | PARAMETER |
| --- | --- |
| $(x_1,y_1)$ | $DCCH_1$ |
| $(x_3,y_3)$ | $DCCH_2$ |
| . | . |
| . | . |
| . | . |

As can be seen by the above description, in the DCCH embodiment, the appropriate DCCH channel for the wireless terminal's current location will be stored in the first entry of the location/parameter table, and the location/parameter table will be updated every T time period. In operation, the wireless terminal may be in a low power consuming sleep mode, and can wake-up to scan the frequency band for a new DCCH only after the time period T has expired and only if the wireless terminal is more than a distance L from a prior location for which the wireless terminal has already scanned for the DCCH. As a result, the appropriate DCCH for a given location is likely to be immediately available in the first entry of the location/parameter table without requiring the wireless terminal to continuously monitor and re-scan the DCCH. Thus, for example, when the wireless terminal needs to initiate a call, it can immediately use the DCCH stored in the first location of the location/parameter table without having to perform a time consuming re-scan of the frequency band. Similarly, the wireless terminal will monitor the DCCH stored in the first location of the location/parameter table for incoming call paging. If the DCCH stored in the first location of the location/parameter table is busy or not available, the wireless terminal can use the DCCH stored in the second location of the location/parameter table to initiate a call or to monitor for an incoming call page. This is because the locations towards the top of the location/parameter table contain the most recently used DCCHs and are thus more likely to be usable in the current location.

In another embodiment of the invention, the location/parameter table is maintained in order to improve the roaming capability of a wireless telephone. As described above, in order for a wireless terminal to operate within the service area of a service provider's MSC, the wireless terminal must register with the MSC and create a visitor location register (VLR) in the memory of the MSC.

In this embodiment of the invention, the location dependent operating parameter is the MSCID. FIG. 5 shows the geographic area serviced by two particular wireless communication service providers. Two geographic areas are shown. Area 502 shows 4 base stations connected to MSC 506 for providing wireless service to wireless terminals operating within geographic area 502. MSC 506 is assigned MSC identification $MSCID_1$. This $MSCID_1$ is transmitted in the DCCH of each of the base stations within geographic area 502. This indicates to wireless terminals operating within area 502 that the serving MSC has an identification of $MSCID_1$. Area 504 shows 4 base stations connected to MSC 508 for providing wireless service to wireless terminals operating within geographic area 504. MSC 508 is assigned MSC identification $MSCID_2$. This $MSCID_2$ is transmitted in the DCCH of each of the base stations within area 504 for indicating to wireless terminals operating in geographic area 504 that the identification of the serving MSC 508 is $MSCID_2$. For purposes of this description, assume a wireless terminal is initially operating at location $(x_1, y_1)$ within geographic area 502.

In this embodiment, the value L represents the distance which, if traveled by the wireless terminal, would generally require that the wireless terminal register with a new MSC. In other words, this is the distance which, if traveled by the wireless terminal, would generally result in the wireless terminal entering a geographic area served by a new MSC (i.e., the wireless terminal is roaming). An advantageous value for the value L in this embodiment would be the average radius of a geographic area served by an MSC (e.g., 50 miles).

Assume for purposes of this description that the location/parameter table stored in the wireless terminal when it is at location $(x_1,y_1)$ has only one entry as follows:

| LOCATION | PARAMETER |
|----------|-----------|
| $(x_1,y_1)$ | $MSCID_1$ |
| . | . |
| . | . |
| . | . |

Next assume that when the timer T times out in step 204 the wireless terminal is located at location $(x_2,y_2)$ as shown in FIG. 5. Thus, in step 206 the wireless terminal will use GPS receiver 114 to determine its current location. In step 208, the wireless terminal will determine that the first entry of the location/parameter table, having location $(x_1,y_1)$, is the closest to the current location of $(x_2,y_2)$ (as shown above, $(x_1,y_1)$ is the only other location in the location/parameter table). Assuming that the distance between $(x_1,y_1)$ and $(x_2,y_2)$ is less than L, control will pass to step 216 at which point the entry containing $(x_1,y_1)$ and $MSCID_1$ is placed in the first location of the location/parameter table. Since this entry is already in the first location, no change to the location/parameter table is required and the method ends in step 218.

Assume now that the next time the timer T times out in step 204 the wireless terminal is located at location $(x_3,y_3)$ as shown in FIG. 5. Thus, in step 206 the wireless terminal will use GPS receiver 114 to determine its current location. In step 208, the wireless terminal will determine that the first entry of the location/parameter table, having location $(x_1, y_1)$, is the closest to the current location of $(x_3,y_3)$ (again, $(x_1,y_1)$ is the only location in the location/parameter table). Now, however, assume that the distance between $(x_1,y_1)$ and $(x_3,y_3)$ is greater than L. Thus, control passes to step 212, at which point the wireless terminal determines the new MSCID for its current location by extracting the MSCID from the DCCH signal received from the serving base station and performs a registration function in order to create a VLR in MSC 508. Next, in step 214, the wireless terminal places its current location $(X_3,y_3)$ and $MSCID_2$ in the first location of the location/parameter table and shifts the other entries down, which results in a location/parameter table as follows:

| LOCATION | PARAMETER |
|----------|-----------|
| $(x_3,y_3)$ | $MSCID_2$ |
| $(x_1,y_1)$ | $MSCID_1$ |
| . | . |
| . | . |
| . | . |

Now assume that the next time the timer T times out in step 204 the wireless terminal is located at location $(x_4,y_4)$ as shown in FIG. 5. Thus, in step 206 the wireless terminal will use GPS receiver 114 to determine its current location. In step 208, the wireless terminal will determine that the second entry of the location/parameter table, having location $(x_1,y_1)$, is the closest to the current location of $(x_4,y_4)$. Assuming that the test in step 210 indicates that the distance between $(x_1,y_1)$ and $(x_4,y_4)$ is less than L, control will pass to step 216 at which point then entry containing $(x_1,y_1)$ and $MSCID_1$ is placed in the first location of the location/ parameter table and the other entries are shifted down. It is noted that in this embodiment of the invention, if step 216 results in the first entry of the location/parameter table being changed, then the wireless terminal must re-register with the MSC identified by the $MSCID_1$ which has been newly placed in the first entry of the location/parameter table. In this situation, the wireless terminal already knows the MSCID of the MSC in the new location, but since the wireless terminal is returning from another geographic area, the wireless terminal must re-register with the MSC to create the appropriate VLR. If however, the execution of step 216 does not result in a change to the first entry of the location/ parameter table (e.g. situation described above where $(x_i,y_i)$ is already in the first entry of the location/parameter table), then there is no need for the wireless terminal to re-register because it is still operating within the same geographic area. The method ends in step 218. The resulting location/ parameter table is as follows:

| LOCATION | PARAMETER |
|----------|-----------|
| $(x_1,y_1)$ | $MSCID_1$ |
| $(x_3,y_3)$ | $MSCID_2$ |
| . | . |
| . | . |
| . | . |

Thus, in operation, the first entry in the location/parameter table will contain the MSCID of the MSC serving the current location of the wireless terminal. Further, if the first entry changes by execution of step 216, or if the first entry changes by execution of steps 212 and 214, the wireless terminal will re-register with the new MSC.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, the location/parameter table could maintain various types of location dependent operating parameters in addition to DCCH and MSCID as described herein. Further, the location/parameter table could simultaneously maintain multiple location dependent operating parameters. For example, the wireless terminal could maintain a location/parameter table which contains both DCCH and MSCID for particular locations. One skilled in the art would recognize that the present invention is not limited to any particular type of location dependent operating parameters.

I claim:

1. A method for maintaining location dependent operating parameters in a wireless communication terminal comprising the steps of:

determining a current location of said wireless communication terminal;

determining whether said current location is within a predetermined distance from a previous location of said wireless communication terminal stored in a memory of said wireless communication terminal; and if said current location is within a predetermined distance from said previous location, then storing said previous location and at least one location dependent operating parameter associated with said previous location in a predetermined memory location in said wireless communication terminal.

2. The method of claim 1 wherein said at least one location dependent operating parameter associated with said previous location is a digital control channel.

3. The method of claim 1 wherein said at least one location dependent operating parameter associated with said previous location is a mobile switching center identification.

4. The method of claim 3 further comprising the step of:
said wireless communication terminal registering with a mobile switching center identified by said mobile switching center identification.

5. The method of claim 1 further comprising the steps of:
if said current location is not within a predetermined distance from said previous location, then generating at least one location dependent operating parameter associated with said current location; and
storing said current location and said location dependent operating parameter associated with said current location in said predetermined memory location of said wireless terminal.

6. The method of claim 5 wherein said step of generating at least one location dependent operating parameter further comprises the step of:
scanning a frequency spectrum for the strongest digital control channel.

7. The method of claim 5 wherein said step of generating at least one location dependent operating parameter further comprises the step of:
extracting a mobile switching center identification from a control channel.

8. The method of claim 7 further comprising the step of:
said wireless communication terminal registering with a mobile switching center identified by said mobile switching center identification.

9. The method of claim 1 wherein said step of determining a current location of said wireless communication terminal further comprises the step of receiving global positioning satellite signals.

10. The method of claim 1 wherein said predetermined distance is the average radius of cells in a wireless communication system.

11. The method of claim 1 wherein said predetermined distance is the average radius of geographic areas served by mobile switching centers.

12. A method for maintaining location dependent operating parameters in a wireless communication terminal comprising the steps of:
determining a current location of said wireless communication terminal;
determining whether said current location is within a predetermined distance from a previous location of said wireless communication terminal stored in a memory of said wireless communication terminal; and
if said current location is not within a predetermined distance from said previous location, then generating at least one location dependent operating parameter associated with said current location; and
storing said current location and said location dependent operating parameter associated with said current location in a predetermined memory location of said wireless terminal.

13. The method of claim 12 wherein said step of generating at least one location dependent operating parameter further comprises the step of:
scanning a frequency spectrum for the strongest digital control channel.

14. The method of claim 12 wherein said step of generating at least one location dependent operating parameter further comprises the step of:
extracting a mobile switching center identification from a control channel.

15. The method of claim 14 further comprising the step of:
said wireless communication terminal registering with a mobile switching center identified by said mobile switching center identification.

16. The method of claim 12 further comprising the step of:
if said current location is within a predetermined distance from said previous location, then storing said previous location and at least one location dependent operating parameter associated with said previous location in said predetermined memory location in said wireless communication terminal.

17. The method of claim 16 wherein said at least one location dependent operating parameter associated with said previous location is a digital control channel.

18. The method of claim 16 wherein said at least one location dependent operating parameter associated with said previous location is a mobile switching center identification.

19. The method of claim 18 further comprising the step of:
said wireless communication terminal registering with a mobile switching center identified by said mobile switching center identification.

20. The method of claim 12 wherein said step of determining a current location of said wireless communication terminal further comprises the step of receiving global positioning satellite signals.

21. The method of claim 12 wherein said predetermined distance is the average radius of cells in a wireless communication system.

22. The method of claim 12 wherein said predetermined distance is the average radius of geographic areas served by mobile switching centers.

23. A wireless terminal comprising
a memory storing program instructions;
a memory storing a location/parameter table;
a controller for executing said program instructions and for controlling the operation of said wireless terminal in accordance with said program instructions, wherein said program instructions define the steps of:
determining a current location of said wireless communication terminal;
determining whether said current location is within a predetermined distance from a previous location of said wireless communication terminal stored in said location/parameter table; and
if said current location is within a predetermined distance from said previous location, then storing said previous location and at least one location dependent operating parameter associated with said previous location in a predetermined location in said location/parameter table.

24. The wireless terminal of claim 23 wherein said predetermined location in said location/parameter table is the first entry of said location/parameter table.

25. The wireless terminal of claim 23 wherein said at least one location dependent operating parameter associated with said previous location is a digital control channel.

26. The wireless terminal of claim 23 wherein said at least one location dependent operating parameter associated with said previous location is a mobile switching center identification.

27. The wireless terminal of claim 26 wherein said program instructions further define the step of:

said wireless communication terminal registering with a mobile switching center identified by said mobile switching center identification.

28. The wireless terminal of claim 23 wherein said program instructions further define the steps of:

if said current location is not within a predetermined distance from said previous location, then generating at least one location dependent operating parameter associated with said current location; and storing said current location and said location dependent operating parameter associated with said current location in said predetermined location in said location/parameter table.

29. The wireless terminal of claim 28 wherein said program instructions defining the step of generating at least one location dependent operating parameter further comprise program instructions defining the step of:

scanning a frequency spectrum for the strongest digital control channel.

30. The wireless terminal of claim 28 wherein said program instructions defining the step of generating at least one location dependent operating parameter further comprise program instructions defining the step of:

extracting a mobile switching center identification from a control channel.

31. The wireless terminal of claim 30 wherein said program instructions further define the step of:

said wireless communication terminal registering with a mobile switching center identified by said mobile switching center identification.

32. The wireless terminal of claim 23 further comprising a global positioning satellite receiver for determining a current location of said wireless communication terminal.

33. The wireless terminal of claim 23 wherein said predetermined distance is the average radius of cells in a wireless communication system.

34. The wireless terminal of claim 23 wherein said predetermined distance is the average radius of geographic areas served by mobile switching centers.

35. A wireless terminal comprising a memory storing program instructions;

a memory storing a location/parameter table;

a controller for executing said program instructions and for controlling the operation of said wireless terminal in accordance with said program instructions, wherein said program instructions defines the steps of:

determining a current location of said wireless communication terminal;

determining whether said current location is within a predetermined distance from a previous location of said wireless communication terminal stored in said location/parameter table; and if said current location is not within a predetermined distance from said previous location, then generating at least one location dependent operating parameter associated with said current location; and storing said current location and said location dependent operating parameter associated with said current location in a predetermined location in said location/parameter table.

36. The wireless terminal of claim 35 wherein said predetermined location in said location/parameter table is the first entry of said location/parameter table.

37. The wireless terminal of claim 35 wherein said program instructions defining the step of generating at least one location dependent operating parameter further comprise program instructions defining the step of:

scanning a frequency spectrum for the strongest digital control channel.

38. The wireless terminal of claim 35 wherein said program instructions defining the step of generating at least one location dependent operating parameter further comprise program instructions defining the step of:

extracting a mobile switching center identification from a control channel.

39. The wireless terminal of claim 38 wherein said program instructions further define the step of:

said wireless communication terminal registering with a mobile switching center identified by said mobile switching center identification.

40. The wireless terminal of claim 35 wherein said program instructions further define the steps of:

if said current location is within a predetermined distance from said previous location, then storing said previous location and at least one location dependent operating parameter associated with said previous location in said predetermined location in said location/parameter table.

41. The wireless terminal of claim 40 wherein said at least one location dependent operating parameter associated with said previous location is a digital control channel.

42. The wireless terminal of claim 40 wherein said at least one location dependent operating parameter associated with said previous location is a mobile switching center identification.

43. The wireless terminal of claim 42 wherein said program instructions further define the step of:

said wireless communication terminal registering with a mobile switching center identified by said mobile switching center identification.

44. The wireless terminal of claim 35 further comprising a global positioning satellite receiver for determining a current location of said wireless communication terminal.

45. The wireless terminal of claim 35 wherein said predetermined distance is the average radius of cells in a wireless communication system.

46. The wireless terminal of claim 35 wherein said predetermined distance is the average radius of geographic areas served by mobile switching centers.

* * * * *